(12) United States Patent
von Aswege et al.

(10) Patent No.: US 12,687,152 B2
(45) Date of Patent: Jul. 21, 2026

(54) METHOD FOR CONTROLLING A WIND POWER INSTALLATION

(71) Applicant: Wobben Properties GmbH, Aurich (DE)

(72) Inventors: Enno von Aswege, Großefehn (DE); Stephan Vollack, Aurich (DE); Henry Mühlenbrock, Hinte (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/520,367

(22) Filed: Nov. 27, 2023

(65) Prior Publication Data

US 2024/0175423 A1 May 30, 2024

(30) Foreign Application Priority Data

Nov. 25, 2022 (EP) ..................................... 22209644

(51) Int. Cl.
*F03D 7/02* (2006.01)

(52) U.S. Cl.
CPC ...... *F03D 7/0276* (2013.01); *F05B 2260/821* (2013.01)

(58) Field of Classification Search
CPC ................ F03D 7/0276; F03D 7/0224; F05B 2260/821; F05B 2270/1011; F05B 2270/327
See application file for complete search history.

(56) References Cited

U.S. PATENT DOCUMENTS

| | | | | |
|---|---|---|---|---|
| 4,462,753 A * | 7/1984 | Harner | .................. | F03D 7/0224 |
| | | | | 416/49 |
| 5,897,293 A * | 4/1999 | Arel | ...................... | B64C 11/303 |
| | | | | 416/49 |
| 7,445,420 B2 * | 11/2008 | Yoshida | ................ | F03D 7/0224 |
| | | | | 415/908 |
| 7,944,067 B2 * | 5/2011 | Kammer | ............... | F03D 7/0224 |
| | | | | 290/44 |

(Continued)

FOREIGN PATENT DOCUMENTS

| | | | | |
|---|---|---|---|---|
| CA | 2780327 A1 * | 5/2011 | ................ | H02J 3/24 |
| CN | 102668296 A * | 9/2012 | ................ | H02J 3/24 |

(Continued)

*Primary Examiner* — Pedro J Cuevas
(74) *Attorney, Agent, or Firm* — Seed Intellectual Property Law Group LLP

(57) ABSTRACT

Method for controlling a wind power installation (100) which has rotor blades (108) whose blade angle is adjustable and which can be operated at a variable speed using speed control, wherein the speed control is prepared to control the speed to a variable target speed value, comprising the steps of evaluating a test criterion for predicting an emerging overspeed, predicting an overspeed $(n_{U})$ on the basis of the at least one test criterion, and changing the speed control if an overspeed $(n_{U})$ has been predicted. Proposed are techniques that avoid an excessive increase in the rotor speed even in the event of strong wind speed increases. In particular, proposed are techniques that avoid reaching an overspeed that leads to shutdown, but without increasing the operating loads too much.

15 Claims, 3 Drawing Sheets

(56) References Cited

U.S. PATENT DOCUMENTS

| | | | | |
|---|---|---|---|---|
| 8,210,811 B2 * | 7/2012 | Loh | F03D 7/0224 | |
| | | | | 416/1 |
| 8,317,471 B2 * | 11/2012 | Axelsson | F03D 7/0204 | |
| | | | | 416/41 |
| 9,478,987 B2 * | 10/2016 | Nelson | H02J 3/241 | |
| 9,745,958 B2 * | 8/2017 | Agarwal | F03D 7/0276 | |
| 10,100,812 B2 * | 10/2018 | Deshpande | F03D 7/0224 | |
| 10,802,482 B2 * | 10/2020 | Bothwell | B64C 13/10 | |
| 11,274,654 B2 * | 3/2022 | Curtis | F03D 7/0248 | |
| 11,599,111 B2 * | 3/2023 | Bothwell | B64C 13/345 | |
| 11,808,249 B2 * | 11/2023 | Esbensen | F03D 7/0264 | |
| 12,049,866 B2 * | 7/2024 | Von Aswege | F03D 7/0224 | |
| 2007/0182162 A1 * | 8/2007 | McClintic | F03D 17/00 | |
| | | | | 290/55 |
| 2011/0109085 A1 * | 5/2011 | Nelson | H02P 9/102 | |
| | | | | 290/44 |
| 2011/0142620 A1 * | 6/2011 | Loh | F03D 7/0244 | |
| | | | | 416/30 |
| 2012/0134807 A1 * | 5/2012 | Axelsson | F03D 7/0224 | |
| | | | | 416/1 |
| 2013/0259686 A1 * | 10/2013 | Blom | F03D 7/0276 | |
| | | | | 416/61 |
| 2015/0076822 A1 * | 3/2015 | Creaby | F03D 7/0276 | |
| | | | | 290/44 |
| 2015/0176570 A1 | 6/2015 | Egedal et al. | | |
| 2015/0377216 A1 * | 12/2015 | Deshpande | F03D 7/045 | |
| | | | | 416/1 |
| 2018/0246510 A1 * | 8/2018 | Bothwell | F02C 9/28 | |
| 2020/0285232 A1 * | 9/2020 | Bothwell | B64C 13/507 | |
| 2022/0049681 A1 * | 2/2022 | Esbensen | F03D 7/0276 | |
| 2024/0026857 A1 * | 1/2024 | Von Aswege | F03D 7/0224 | |
| 2024/0218854 A1 * | 7/2024 | von Aswege | F03D 7/028 | |

FOREIGN PATENT DOCUMENTS

| | | | | | |
|---|---|---|---|---|---|
| EP | 2851560 A1 * | 3/2015 | | F03D 7/0204 |
| EP | 2963284 A1 * | 1/2016 | | F03D 7/0224 |
| EP | 2499714 B1 * | 7/2018 | | H02J 3/24 |
| EP | 3828408 A1 | 6/2021 | | |
| EP | 4375502 A1 * | 5/2024 | | F03D 7/0224 |
| EP | 3830415 B1 * | 7/2024 | | F03D 7/0224 |
| WO | WO-2011059706 A2 * | 5/2011 | | H02J 3/24 |

* cited by examiner

METHOD FOR CONTROLLING A WIND POWER INSTALLATION

BACKGROUND

Technical Field

The present disclosure relates to a method for controlling a wind power installation and to a corresponding wind power installation.

Description of the Related Art

Wind power installations generate electrical power from wind. For this purpose, they have an aerodynamic rotor which is driven by the wind and rotates at a rotor speed.

The rotor speed depends on the wind speed during partial-load operation when the wind speed is less than a nominal wind speed. For this purpose, a wind speed-dependent rotor speed, which can also be referred to in simplified form as speed in this case, is often specified. The specification is made in such a way that the wind power installation works optimally, especially aerodynamically optimally. For implementation during operation of the wind power installation, such a speed specification is stored in a speed/power characteristic curve.

During full-load operation, when the wind speed is above the nominal wind speed, and in some cases also in a transition range from partial-load operation to full-load operation, speed control is performed, which regulates the rotor speed to a predefinable speed, often the nominal speed. Basically, such speed control mainly performs a function as speed limitation, because during full-load operation there is sufficient wind power to increase the rotor speed above a desired target value of the rotor speed, which is intended to be prevented by the speed control.

The design of the speed control, both with regard to the functional design, i.e., how the control is intended to function and in particular what structure it has, and with regard to the selection of the speed control parameters, is often carried out using load design cases prescribed in guidelines. Such guidelines therefore prescribe the design such that the wind power installation is suitable for loads that are to be taken into account according to the guideline.

However, it may be the case that such a design of the speed control is not sufficient. This is because it may be the case that, in some locations, wind conditions occur that resemble steep ramps, i.e., wind conditions in which the wind speed increases rapidly over time and possibly also to a large value. In such situations, overspeeds can occur, which can lead to shutdowns. Such shutdowns are undesirable because they can lead to revenue losses and are also technically undesirable since they can constitute an increased mechanical load on the wind power installation.

To solve the problem, a controller gain could be increased so that, in case of a strongly rising wind speed, the speed control counteracts a speed increase accordingly quickly in order to thereby prevent the overspeed.

Speed control with a high gain can, however, in turn lead to undesirable results, such as increases in operating loads or pitch angle oscillations. In other words, a high controller gain of the speed control can lead to strong adjustment activities, such as the adjustment of the blade angles of the rotor blades of the aerodynamic rotor, which can lead to a high load there. Speed control by means of a generator torque can result in severe braking of the aerodynamic rotor, which is also stressful for parts of the wind power installation, or which leads to an excessive output power.

BRIEF SUMMARY

The present disclosure may address at least one of the abovementioned problems. In particular, proposed is a solution that avoids an excessive increase in the rotor speed even in the event of strong wind speed increases. In particular, provided is a method to avoid reaching an overspeed that leads to shutdown, but without increasing the operating loads too much. At the very least, the intention is to propose an alternative to previously known solutions.

The method concerns the control of a wind power installation. The wind power installation has rotor blades whose blade angle is adjustable. Such adjustment is also called pitching and the blade angles are called pitch angles. The wind power installation can therefore be operated at a variable rotor speed using speed control. For this purpose, the speed control is prepared to control the speed to a variable target speed value. How this is done is explained below. The variable target speed value can be specified in particular by the operational management or design of the wind power installation. Especially during full-load operation, the target speed value can be set to a nominal speed for which the wind power installation is designed.

However, the target speed value can also be set temporarily to other values and it can also be set to a different, in particular lower, value than the nominal speed for other reasons, for example due to regulations.

The method proposes, in particular, evaluating a test criterion for predicting an emerging overspeed. An overspeed is, in particular, a speed that is so high that a shutdown is triggered. In particular, an overspeed can describe a speed value that is above the nominal speed, in particular by a percentage of 1 to 20%, in particular 5 to 15%, above the nominal speed, or above another target speed, especially when a different speed is specified as the nominal speed, namely, in particular, a lower one.

Predicting an emerging overspeed is thus predicting a speed increase that would lead to an overspeed without a countermeasure, at least without a suitable countermeasure.

An overspeed is thus predicted on the basis of the at least one test criterion. Here too, it is important that this overspeed is expected according to the prediction if no countermeasure prevents this, i.e., if the speed control in particular does not prevent this.

It is then proposed that the speed control is changed if an overspeed has been predicted. The wind power installation thus has speed control that is designed differently in the event of a predicted overspeed than in the event of no overspeed being predicted.

The speed control can be changed in particular by changing at least a controller gain. However, it also comes into consideration that the structure of the speed control is changed, for example by adding a differential component, i.e., a D component, in the case of a predicted overspeed, to give just one example.

Non-linear speed control may also be provided and/or a change may be provided, in the case of which there is switching between linear speed control for an unpredicted overspeed and non-linear control for a predicted overspeed or vice versa.

It was recognized here, in particular, that it may be useful to have a high gain of the speed control only in rare critical situations. The speed control can then react quickly due to the high gain. This can result in an increased load on the wind power installation, both for the load on the actuators used by the speed control, and also in a higher load resulting from the possible braking of the rotor. This is acceptable, however, if it is only used in such rare critical situations, i.e., only when there is a high gain of the speed control which puts a strain on the wind power installation.

In addition, however, it was recognized that it is important which criterion is used as a basis for carrying out such an increase in the speed gain. Furthermore, the explanation as regards increasing the speed control gain should also be understood here as an example of any change in the speed control that counteracts the speed increase.

It was recognized, in particular, that taking an overspeed threshold as a basis cannot be sufficient as a criterion. Such an overspeed threshold can be a speed threshold which in particular is greater than the target speed or nominal speed, but less than the overspeed. If the speed reaches the overspeed threshold, this would be the criterion for increasing the speed control gain in order to stay with this example of the speed control change. However, it was recognized that such a criterion, which tests only for an absolute speed value, can lead to an excessively frequent change in the speed control. For example, the rotor speed can reach a specified overspeed threshold value without having to increase further afterwards. In this case, the speed gain would still be increased. This would lead to an increased load, even though it would not be necessary.

It is therefore proposed to predict an overspeed. In particular, this can be illustrated by the fact that, in the case of a linearly increasing speed for example, especially if the increase is steep, it can be expected that the speed will also increase to overspeed, and then lead to a shutdown. However, if the speed increase flattens over time, although the speed may increase above the said speed threshold value, it may not be expected, due to the flattening, that the overspeed value will be reached.

The proposed prediction allows this distinction to be made. This can be used to identify whether it can be expected that the speed would also continue to increase to overspeed.

A test criterion can be in particular an increase in the speed over time, in particular also the manner in which the speed increases, i.e., whether its increase rate increases, decreases or remains constant and, if appropriate, also the extent to which it decreases or increases. Extrapolating a time profile of the speed is thus a prediction possibility or aid. However, there are also other possibilities.

According to one aspect, it is therefore proposed that the speed control is changed in such a way that a controller gain of the speed control is increased if an overspeed has been predicted. This case which has already been described above is therefore a preferred way of changing the speed control. If an overspeed is predicted, the controller gain is increased, which leads to the fact that the speed deviation, i.e., if the speed is already above the target speed value, leads to a stronger actuating action than if there is a smaller gain with the same speed deviation. This will accordingly counteract the speed increase more than the unchanged controller would do, and it can prevent an overspeed from being reached.

According to one aspect, it is proposed that an overspeed denotes a speed which reaches or exceeds a speed limit value which is above a target speed, in particular a nominal speed, by a minimum exceedance value. In particular, the minimum exceedance value is at least 5%, preferably at least 10%, in particular at least 15%, of the target speed or nominal speed.

Additionally or alternatively, the changing of the speed control is carried out or started before the speed reaches the speed limit.

The proposed method therefore prevents, in particular, a speed increase from reaching values of 5 or 10% or 15% or more above the target speed or nominal speed. As a result of the prediction, the speed control can be changed at an early stage in order to counteract a speed increase at an early stage in order to thereby prevent the overspeed from being reached. Prediction ensures that the speed control is changed at an early stage in order to thereby effectively counteract the speed increase. In particular, it is proposed that the changing of the speed control is carried out or started before the speed reaches a value of 97% of the speed limit value. For this aspect, it is assumed in particular that the minimum exceedance value is at least 5% of the target speed or nominal speed.

In particular, the techniques provided herein prevent the speed from exceeding a nominal speed too much. Such exceedance can damage the wind power installation, as the wind power installation is only designed for continuous operation up to the nominal speed. However, it also comes into consideration that, especially temporarily, other speeds are specified as the target speed instead of the nominal speed. This can particularly concern cases where regulations require a lower speed, at least temporarily. However, it also comes into consideration that special operating and/or environmental situations specify a speed that is lower than the nominal speed as the target speed. This can be, for example, in the event of a storm or at very low outside temperatures that can lead to such brittle material that it is advisable to operate at a speed lower than the nominal speed. Any descriptions given below in connection with the nominal speed must also be applied analogously to other target speeds.

According to one aspect, it is proposed that the changing of the speed control is only carried out or started if the speed is above 90%, in particular above 100%, of the target speed or nominal speed. This can prevent an overspeed from being predicted incorrectly at low speeds or too early. This prevents the speed control from being changed too frequently or too early.

However, due to the fact that, according to one variant, the speed control is already changed at a value of 90% of the target speed, it is nevertheless possible to prevent an overspeed comparatively early. This is thus possible earlier than with methods in which an impending overspeed is only derived from absolute values that must be above the target speed due to the system. Thus, even with the variant which provides for a speed change only from 100% of the target speed, it is possible to react earlier than with conventional methods.

According to one aspect, it is proposed that, in order to predict an emerging overspeed, a speed profile is recorded as a time profile of the speed up to a current time and extrapolated beyond the current time to a test time. An emerging overspeed is predicted on the basis of this speed profile. Several possibilities are considered, in which the speed profile indicates an emerging overspeed.

One possibility is that the speed profile has a speed increase above a predefinable increase limit value up to the test time. If the speed profile is thus particularly steep, an emerging overspeed is assumed. The increase limit value can be used to determine what should be considered too steep an increase. For determining or specifying such an increase limit value, it is possible to take as a basis empirical values from previous measurements in which an overspeed occurred.

Another possible way of inferring an emerging overspeed, i.e., predicting an emerging overspeed, is to evaluate a change in the gradient of the speed profile. If the speed profile has a gradient that increases over time, an emerging overspeed can be inferred, which is then predicted. In this case, an emerging overspeed is thus predicted if a time derivative, i.e., differentiation, of the gradient of the speed profile is positive. To illustrate this, such a speed profile is bent upwards.

It was recognized in particular here that an overspeed can soon be reached as the gradient increases. Although it comes into consideration that an increasing gradient will also decrease again, the time in which a speed that increases above the target speed or above the nominal speed reaches overspeed can be very short and, for example, can be in the range of only a few seconds. If an increasing gradient is identified in this short time range, it cannot be assumed that it will almost recover again within this short time range.

The possibilities for evaluating the speed profile can also be combined. This allows a change in the gradient and the absolute value of the gradient to be evaluated together. For example, a weak gradient decrease can still cause an over-speed if the gradient is high. However, in the event of a sharp gradient decrease, the high gradient does not have to lead to an overspeed.

In particular, the gradient and a change in the gradient can also be evaluated for the speed profile without explicit extrapolation, because the evaluation of the gradient and the change in the gradient of the speed profile indirectly makes a statement about the future, i.e., expected, speed profile.

If the extrapolated speed profile reaches overspeed by the test time, this is another possible way of predicting an emerging overspeed. Preferably, such an extrapolation can be linear, quadratic or of an even higher order, which may also depend on the number of recorded speed values.

In particular, an extrapolation can be carried out by determining a speed function on the basis of the time from recorded speed values. Such a speed function can be represented as a polynomial function.

A linear extrapolation results in a linear polynomial function as a speed function $n(t)$ with the polynomial parameters $a_0$ and $a_1$ and the time t:

$$n(t)=a_0+a_1*t$$

A quadratic extrapolation results in a quadratic polynomial function as a speed function $n(t)$ with the polynomial parameters $a_0$, $a_1$ and $a_2$ and the time t:

$$n(t)=a_0+a_1*t+a_2*t^2$$

An extrapolation of the n-th order accordingly results in a polynomial function of the n-th order as a speed function $n(t)$ with the polynomial parameters $a_0$, $a_1$ to an and the time t:

$$n(t)=a_0+a_1*t\ldots+a_n*t^n$$

To determine the speed functions, at least one speed value more than the order must be recorded, i.e., at least $n+1$ values for a polynomial function of the n-th order. If exactly $n+1$ speed values are recorded, the polynomial parameters can be calculated unambiguously. If more than $n+1$ speed values are recorded, i.e., if there is an overdetermination, the polynomial parameters can be determined, for example, using the least squares method.

For both cases, i.e., with or without overdetermination, a system of equations with as many equations as recorded values can be established and solved accordingly. For the least squares method, the system of equations can be solved numerically using a pseudo-inverse.

A quadratic extrapolation is particularly preferred, i.e., the speed function is formed by a quadratic polynomial function. Such an extrapolation can also take into account the trend of the speed profile, i.e., whether a gradient of the speed function increases, decreases or remains the same. The three polynomial parameters are easy to calculate even in the event of overdetermination, as an inverse needs to be formed only from a 3×3 matrix. The calculation of such an inverse can be pre-programmed if the number of speed measured values to be evaluated is known, with the result that an implementation as an online calculation is possible.

The speed function then represents the extrapolated speed profile for future speed values. If the extrapolated speed profile reaches overspeed, there is still enough time to react, with the result that the actual speed can still be sufficiently controlled such that overspeed is no longer reached.

According to another possibility, it is proposed that the extrapolated speed profile exceeds a limit speed that is less than the overspeed before the test time is reached. This is based on the idea that, if the speed profile exceeds a lower limit value before the test time, i.e., earlier, it can then reach the overspeed later. It is also possible to specify such a limit speed in a simple way. It is therefore only necessary to determine the speed profile, to extrapolate it at least up to the test time, and to compare it with the limit speed at the pre-test time. For example, the pre-test time can be between the current time and the test time and the limit speed can assume an average value between the target speed or nominal speed and overspeed. In this case, an emerging over-speed is assumed if the extrapolated speed profile has reached half of a speed increase from the target speed or nominal speed to overspeed almost after half the time.

According to one aspect, it is proposed that quantitative changing of the speed control, in particular the increasing of a controller gain, is carried out on the basis of the extrapolated speed profile. It is therefore proposed that it is not only decided on the basis of the extrapolated speed profile whether the speed gain is increased at all, but also that the level of the controller gain, or other changes in the speed control, depend on the extrapolated speed profile. In this respect, the extrapolated speed profile is also evaluated quantitatively.

In particular, this quantitative changing of the speed control, in particular the increasing of the controller gain, is carried out on the basis of a magnitude of the speed increase. In particular, the controller gain is increased more, the greater the speed increase.

Here it was recognized that it is not only possible to identify an imminent overspeed in good time via the extrapolated speed profile, but it was also recognized that the extrapolated speed profile opens up the possibility of specifically counteracting the speed increase to a greater or lesser extent.

Additionally or alternatively, it is proposed that the quantitative changing is carried out on the basis of a distance between the speed or the extrapolated speed profile and the limit speed or a speed threshold value which is less than the limit speed and greater than the target speed or nominal speed. In particular, it is proposed that there is stronger counteraction, in particular the controller gain is thus set to be higher, the shorter the distance between the speed or the extrapolated speed profile and the limit speed or the speed threshold value. The distance therefore refers to the difference between the limit speed and the speed, with the result that the distance is thus positive if the speed is lower than the limit speed. In other words, the distance relates to the speed approaching the limit speed from below. The same applies to the speed threshold value.

When looking at the extrapolated speed profile, the distance to the test time can be determined. This allows a permanently definable criterion which also allows a good comparability and repeatability of the evaluation of the distance.

In particular, the quantitative changing of the speed control is carried out in such a way that the controller gain is increased more, the greater a speed increase of the speed profile, in particular of the extrapolated speed profile, and/or the closer the extrapolated speed profile comes to the limit speed. The latter should be understood in such a way that the speed profile is, however, still below the limit speed.

According to one aspect, it is proposed that speed control using a blade angle adjustment is provided, in which the blade angle is changed on the basis of the speed. In particular, the blade angle or an adjustment rate of the blade angle can be referred to here as the manipulated variable of the speed control. The speed control works in particular in such a way that a speed deviation, i.e., a difference between the target speed value and the actual speed value, which can also be referred to as a control deviation, leads via a controller to a planned blade angle, or leads via a controller to a planned adjustment rate of the blade angle.

For this purpose, it is also proposed that an overspeed is predicted if the blade angle deviates from a variable reference blade angle by a predefinable differential blade angle. It was recognized in particular here that, in the case of such speed control using a blade angle adjustment, the blade angle can provide information about the speed. Based on this idea, it is possible to specify a reference blade angle which is currently to be expected, especially in steady-state operation. If the blade angle deviates from this reference blade angle, it indicates that the speed control has increased actuation activity. Such increased actuation activity can indicate a rapid, in particular excessively rapid, change in the speed and can thus indicate an overspeed.

In particular, it is proposed that an ideal blade angle is specified as the reference blade angle, and the ideal blade angle describes a blade angle that leads to a constant speed at a current operating point under steady-state conditions.

The operation of a wind power installation is usually well known in terms of its behavior and in some cases is very precisely specified. A blade angle can be assigned to a current operating point under steady-state conditions, especially ideal conditions in which the wind does not change, and can therefore be expected for this operating point. This blade angle is referred to as the ideal blade angle, because it appears when all conditions are ideal. The fact that all conditions are ideal in this case means that they correspond to the requirements that were taken as a basis, in particular when designing the wind power installation. If this operating point thus appears, the ideal blade angle must be expected. This is thus taken as a basis as the reference blade angle and the actual blade angle is compared with it.

If the actual blade angle and the reference blade angle, i.e., the ideal blade angle in this case, are identical, ideal conditions, in particular steady-state conditions, are accordingly also present. However, if the blade angle deviates from this ideal reference blade angle, this allows a conclusion to be drawn about changes and, depending on the magnitude of the deviation, an imminent overspeed.

In particular, it is proposed that the current operating point is indicated by a current speed value, a current generator power and a current wind speed. These values allow the operating point to be well defined and there is usually an ideal blade angle that should appear based on the design of the wind power installation. This can be accordingly used well as a reference blade angle in order to detect deviations.

According to one aspect, it is proposed that quantitative changing of the speed control, in particular the increasing of the controller gain, is carried out on the basis of a magnitude of the blade angle deviation, by which the blade angle deviates from the variable reference blade angle. In particular, the speed control is changed in such a way that the controller gain is increased more, the greater the blade angle deviation.

Here it was recognized in particular that a deviation of the blade angle from the reference blade angle, i.e., in particular the deviation of the blade angle from the ideal blade angle, cannot only be an indicator that an overspeed is imminent, but that this deviation can also be evaluated quantitatively. The greater this deviation, the stronger the actuation activity of the speed control also was. That is to say, the more the speed control tried to counteract a speed increase. It was recognized in particular here that the speed control also ultimately has the effect of counteracting a speed increase. The observation of the speed or speed change is thus the observation of a controlled speed. In particular, a strong increase in the wind speed, which can lead to a speed increase, is less noticeable in such a controlled speed.

According to one variant, it is proposed that the controller gain is increased if the blade angle deviation exceeds a predetermined minimum deviation value. This means that small deviations that can occur during operation without the risk of an overspeed are not interpreted as an imminent overspeed. The predetermined minimum deviation value can preferably be at least 3°, in particular at least 5°.

In any case, the deviation of the blade angle from the reference blade angle, i.e., in particular from the ideal blade angle, also quantitatively provides information about the actuation activity of the speed control and thus quantitatively provides information about the increase in wind speed that leads to the acceleration of the rotor. The greater the deviation between the blade angle and the reference blade angle, the greater the increase in the wind speed and the greater the risk of an overspeed. Accordingly, the controller gain can also be adjusted quantitatively, i.e., to a greater extent, the greater the blade angle deviation.

According to one aspect, it is proposed that damping control is provided and involves a change in the blade angle depending on a detected longitudinal oscillation of the wind power installation in order to dampen the longitudinal oscillation, and that the damping control is changed if an overspeed has been predicted. In this respect, a longitudinal oscillation of the wind power installation, as is well known to a person skilled in the art, denotes an oscillation of the tower with the nacelle in the axial direction of the rotor axis. In other words, the wind power installation oscillates back and forth, i.e., toward and away from the wind, i.e., in the wind direction, when it is aligned with the wind, which is referred to as longitudinal oscillation.

Such longitudinal oscillations can be dampened by adjusting the blade angles of the rotor blades slightly. Expressed clearly and in a simplified manner, the rotor blades can be rotated in the direction of a feathered position, for example, when the installation is currently oscillating with the wind, in order to thereby offer a little less attack surface for the wind and thus to be pushed less in this oscillation direction by the wind. If the installation oscillates back, i.e., against the wind, the rotor blades can be rotated away slightly from the feathered position again, i.e., such that they offer a little more resistance to the wind, with the result that the wind slows down the movement in this direction counter to the wind direction.

It has been recognized that, in the event of an imminent overspeed, the speed control has high priority to prevent the overspeed. The damping control against the longitudinal oscillation could weaken the effectiveness of the speed control, and so it is proposed that, if an overspeed has been predicted, the damping control should be changed, in particular at least attenuated or even deactivated.

In addition, it is possible for the damping control to be changed in such a way that a gain of the damping control is reduced. As an additional or alternative possibility, the damping control can be changed so as to deactivate it. When combined with the gain reduction, this may mean that the gain is first reduced and then the damping control is deactivated. However, the damping control can also be deactivated immediately if an overspeed has been predicted. It also comes into consideration that the damping control is deactivated by setting a gain of the damping control to zero.

Additionally or alternatively, it comes into consideration that an adjustment of the blade angles of the rotor blades by the damping control is allowed only in the direction of a feathered position. Here it was recognized in particular that the adjustment of the rotor blades in the direction of a feathered position reduces the speed and, in this respect, such a part of the damping control assists the speed control with the task of countering the excessive increase in the speed.

According to one aspect, it is proposed that the changing of the speed control is only completely cancelled by a predeterminable extension time after the time at which an overspeed is no longer predicted, wherein the predeterminable extension time is particularly in the range of one to ten seconds, in particular in the range of 2 to 5 seconds.

In principle, speed control is designed for normal operation and should also be used in the designed parameterization. In particular, increasing the speed control gain is not optimal for continuous operation, as it could—depending on the design and boundary condition—also intensify oscillations and/or lead to an increased adjustment activity of the rotor blades which puts a strain on the installation. Nevertheless, it was recognized that the extension of the time in which the speed control gain is increased is comparatively short, with the result that neither appreciable oscillation problems can occur nor a permanently stressful increased actuation activity occurs. It is therefore possible and sensible to allow the speed control to be changed for a little longer until an overspeed is no longer predicted, that is to say the installation is back in safe operation again.

A wind power installation is also proposed. The wind power installation has rotor blades whose blade angle is adjustable and which can be operated at a variable speed using speed control. The speed control is prepared to control the speed to a variable target value. The wind power installation is prepared to carry out the following steps.

One step is evaluating a test criterion for predicting an emerging overspeed. Another step is predicting an overspeed on the basis of the at least one test criterion, and yet another step is changing the speed control if an overspeed has been predicted.

In particular, it is proposed that the wind power installation has an installation control unit in order to control the wind power installation, and that the wind power installation, in particular this installation control unit, is prepared to carry out a method according to one of the aspects explained above. For this purpose, the speed control can be implemented in the installation control unit. In addition, an evaluation algorithm can be implemented in the installation control unit in order to evaluate the test criterion and also to predict the overspeed on the basis thereof. For this purpose, corresponding algorithms according to the aspects explained can be implemented in a process computer of the installation control unit. Sensors normally present in the wind power installation anyway can be used to capture the speed, or a speed signal that is used in a wind power installation anyway and reflects the current speed can be used.

The wind power installation therefore operates as explained above in connection with aspects of the method.

BRIEF DESCRIPTION OF THE SEVERAL VIEWS OF THE DRAWINGS

The invention is explained in more detail below, by way of example, with reference to the accompanying figures.

DETAILED DESCRIPTION

Figure 1:
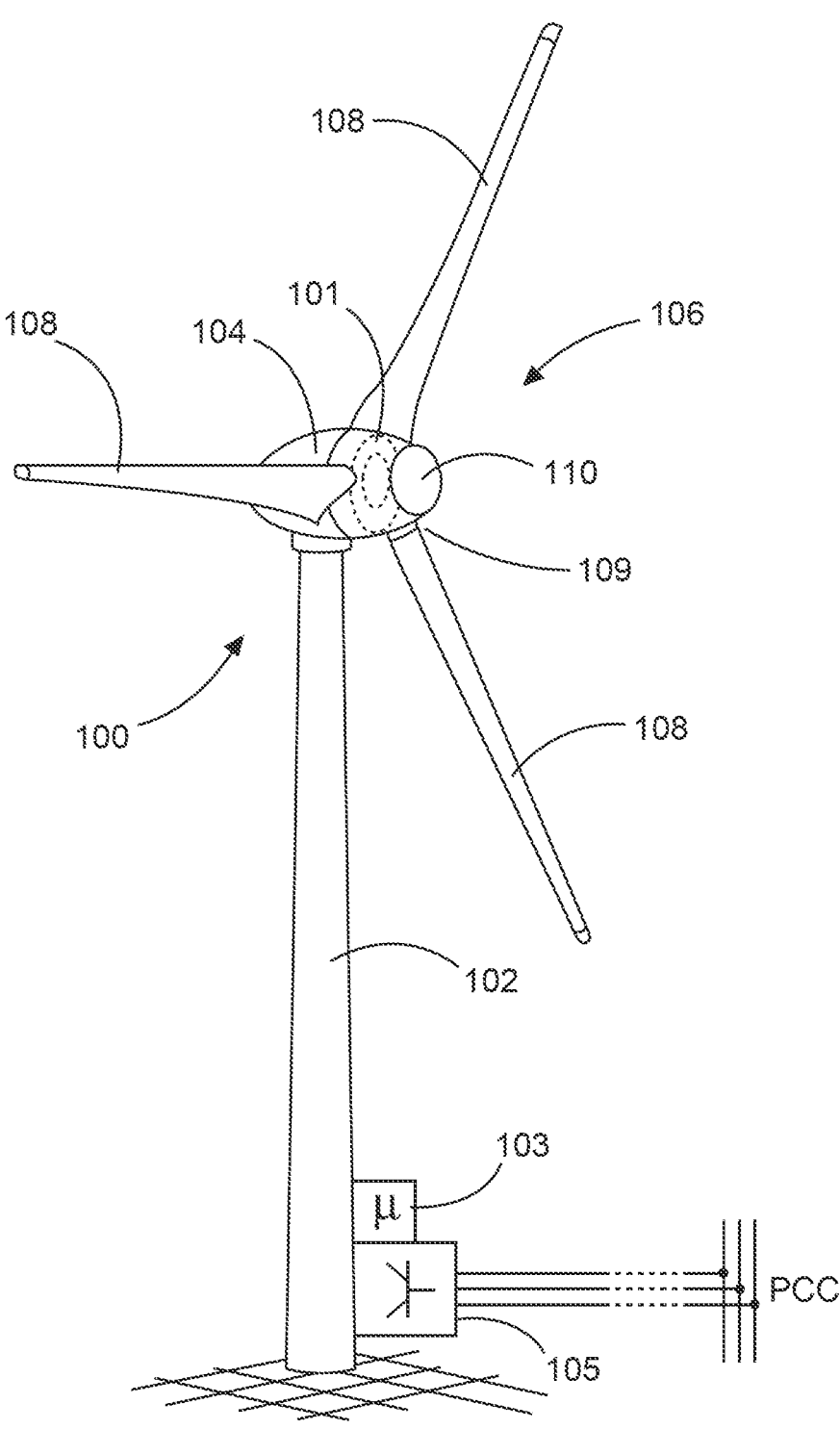
FIG. 1 shows a perspective view of a wind power installation.

FIG. 1 shows a schematic illustration of a wind power installation according to the invention. The wind power installation 100 has a tower 102 and a nacelle 104 on the tower 102. An aerodynamic rotor 106 with three rotor blades 108 and a spinner 110 is provided on the nacelle 104. During operation of the wind power installation, the aerodynamic rotor 106 is set in rotation by the wind and thus also turns an electrodynamic rotor of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots 109 of the respective rotor blades 108.

The wind power installation 100 has an electric generator 101 which is indicated in the nacelle 104. The generator 101 can be used to generate electrical power. A feeding-in unit 105, which can be designed in particular as an inverter, is provided for the purpose of feeding in electrical power. It is therefore possible to generate a three-phase infeed current and/or a three-phase infeed voltage, according to amplitude, frequency and phase, for feeding in at a grid connection point PCC. This can be done directly or together with other wind power installations in a wind farm. An installation controller 103 is provided for the purpose of controlling the wind power installation 100 and also the feeding-in unit 105. The installation controller 103 can also receive specified values from external sources, in particular from a central farm computer.

Figure 2:
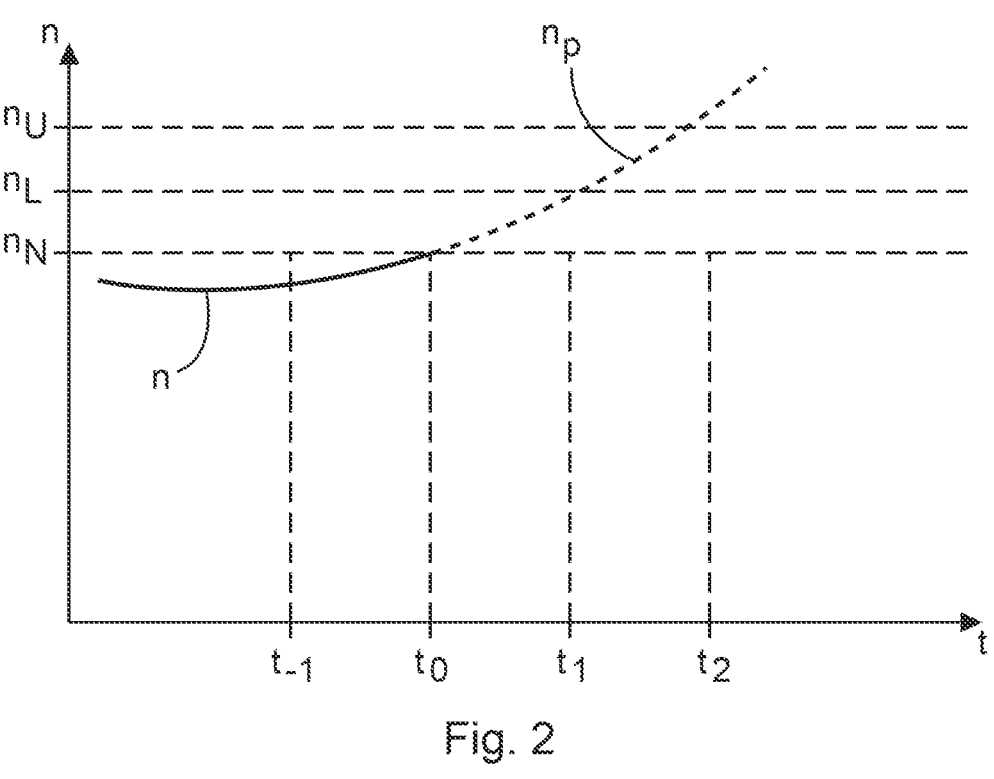
FIG. 2 shows a graph for illustrating an overspeed prediction.

FIG. 2 shows a graph for illustrating a speed prediction by means of a speed profile and thus also a prediction of whether an overspeed can be expected. The time is plotted on the abscissa, and the speed is plotted on the ordinate.

Depicted as relevant speed values to be taken into account are a nominal speed $n_N$, a limit speed nd and an overspeed $n_U$, wherein the nominal speed $n_N$ is also representative of other target speeds. In the graph, the speed n is represented by a solid line as the speed profile and this profile is recorded at least from the time $t_{-1}$ to the current time $t_0$. A plurality of values can be recorded between these two times $t_{-1}$ and $t_0$, not only at the two times depicted. The time $t_0$ thus indicates the current time at which the measurement and evaluation are carried out.

The speed profile continues with a dashed line representing an extrapolated speed profile $n_P$.

At the time $t_0$, the speed values recorded up to then, in particular from the time $t_{-1}$ on, are thus evaluated and the extrapolated speed profile $n_P$ is determined therefrom. A speed function n(t), for example, can be determined from the recorded speed values, as a function on the basis of the time, by means of a polynomial function. The extrapolation is carried out up to the test time $t_2$. The extrapolation can be carried out linearly, for example, or, as indicated in FIG. 2, by assuming a quadratic profile, which is not exactly illustrated in FIG. 2, but is merely implied.

In FIG. 2, the speed profile reaches the nominal speed at the time $t_0$. However, this is not a prerequisite, and instead, monitoring is carried out continuously, regardless of the value reached by the speed or the speed profile. However, provision may be made for the speed control to be changed only when the speed has reached at least 90% or at least 100% of the target speed, in this case the nominal speed.

One possibility for evaluation is now to check whether the extrapolated speed profile has reached the value of the overspeed $n_U$ at the test time $t_2$. In the case illustrated, this is the case because the uppermost dashed line, which stands for the overspeed $n_U$, is reached shortly before the test time $t_2$ is reached and is then exceeded.

Another possibility for the test is to check whether the limit speed $n_L$ has been reached at an earlier time, namely the predefinable pre-test time $t_1$. This is also the case in the present example, with the result that this test also comes to the conclusion that an overspeed can be expected.

Further possibilities for evaluation have also been described further above and should not be excluded by this exemplary representation in FIG. 2.

Figure 3:
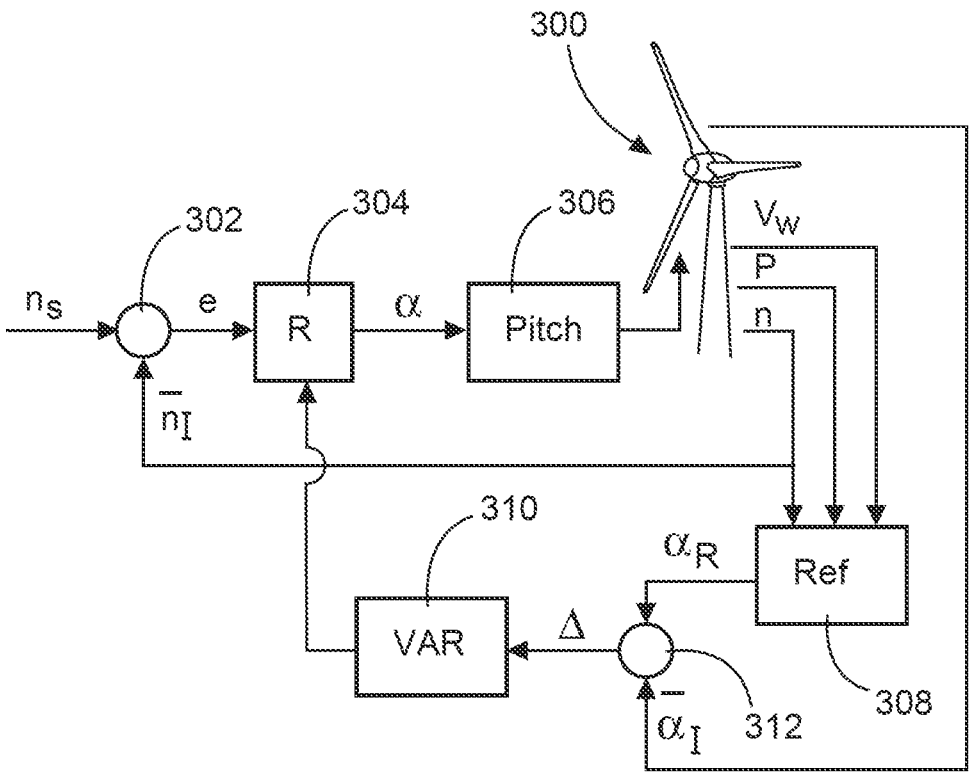
FIG. 3 schematically shows a control structure with speed control and an angle evaluation.

FIG. 3 shows a structure of speed control applied to a symbolically represented wind power installation 300. An angle evaluation is also illustrated.

The speed control illustrated in simplified form is carried out in such a way that an actual speed $n_1$ is subtracted from a target speed ns at the first summing point 302. The result is a control deviation e which is passed to the controller 304. The controller 304 can be a PI controller that outputs a blade angle α that does not become zero even if the control error e becomes zero. However, this controller is only used for illustration in FIG. 3. Much more often, use is made of a controller that does not output a blade angle, but rather an adjustment rate for the blade angle. Such a controller, which outputs an adjustment rate on the basis of the control error e, could be designed as a pure P controller. The use of a controller that outputs a blade angle α as the manipulated variable has only been selected for illustrative purposes.

In any case, the blade angle α is then fed to the actuator 306 which adjusts the rotor blades. If an adjustment rate were specified, this would be passed to the actuator accordingly. The actuator 306 adjusts in particular all three rotor blades of the wind power installation 300, because nowadays wind power installations usually have three rotor blades.

A speed n then occurs accordingly and can be measured and fed back, thereby closing the speed control loop.

It is now proposed that a reference blade angle $\alpha_R$ is determined in order to predict whether an emerging overspeed can be expected, i.e., in order to predict an overspeed. This reference blade angle $\alpha_R$ is determined in the reference block 308. For this purpose, the reference block 308 receives the current speed n, the current power P, i.e., in particular the power currently generated, and the current wind speed $v_W$ as input variables. These three variables essentially reflect the current operating point and a reference angle, i.e., reference blade angle, can be assigned to this. This assignment is stored in the reference block 308, e.g., as a multi-dimensional table, or as a function, with the result that the reference block 308 can determine the reference blade angle $\alpha_R$, in particular the ideal blade angle, for the current operating point. Furthermore, for illustrative reasons, the currently captured speed at the output of the wind power installation 300 is denoted n, but is denoted $n_I$ at the input of the first summing point 302. However, these two variables are identical.

The actually captured blade angle $\alpha_1$ is subtracted from the reference blade angle $\alpha_R$, which is determined in this way and in this respect represents an ideal angle, at the second summing point 312. The difference Δ is entered in the variation block 310. Depending on the entered difference Δ between the two blade angles, the variation block decides whether there is a risk of an overspeed. If this is the case, the variation block 310 also calculates a variation of the speed controller to be made according to the level. The greater the deviation of the two blade angles, namely in terms of magnitude, the greater also the variation that can be performed.

In a simple example, the variation block 310 then changes a controller gain in the controller 304. In the case of a PI controller to be assumed, this can be, in particular, the proportional portion of the controller, which is increased depending on the deviation of the two blade angles. In the case of a pure P controller, where an adjustment rate for the blade angle is output, it may also come into consideration that the only gain that such a controller can have is changed accordingly.

As a precaution, it is pointed out that, according to the illustration in FIG. 3, in the case of a strong blade angle deviation which indicates an overspeed, the captured blade angle $\alpha_1$ is greater than the reference blade angle $\alpha_R$. In this relevant case, the deviation Δ at the output of the second summing point 312 is therefore initially negative. To simplify the calculation, it comes into consideration that this negative value is changed in terms of its signs by an inverter in the variation block 310. The calculation of a controller change can then be made on such a positive value. The inputs at the summing point 312 can also be swapped.

However, it also comes into consideration that an overspeed prediction based on an extrapolated speed profile is additionally made, as illustrated in FIG. 2. One possibility for combination is that the extrapolated speed profile according to FIG. 2 is used to determine whether an overspeed can be assumed at all, and the level of the blade angle deviation is then determined depending on which value the second summing point 312 outputs as the deviation Δ.

However, it also comes into consideration that a controller gain change is calculated both on the basis of the extrapolated speed profile and also on the basis of the deviation between the reference blade angle $\alpha_R$ and the current blade angle $\alpha_I$, as shown in FIG. 3. Both values calculated in this way can be combined by means of a weighting in order to change the controller, in particular to change a controller gain. For example, both calculations can each be multiplied by 0.5 and the result added up to give the value by which the controller is to be adjusted.

Figure 4:
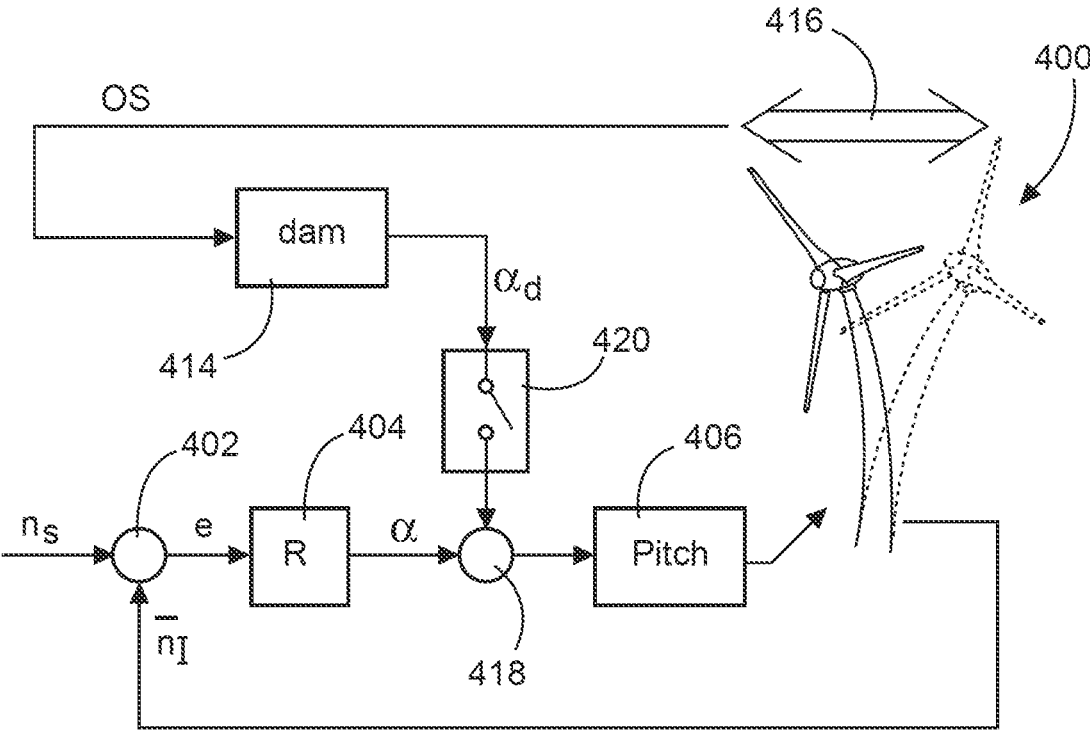
FIG. 4 schematically shows a structure with speed control and longitudinal damping control.

FIG. 4 illustrates a consideration of longitudinal damping control in the structure shown. The longitudinal damping control uses a longitudinal damping controller 414 which outputs a damping blade angle $\alpha_d$ on the basis of a longitudinal oscillation OS. Also in the representation of the structure in FIG. 4, the specification of a direct blade angle for both the longitudinal damping controller 414 and the speed controller has been selected only for the purpose of illustration. In this case, it comes into consideration, for both the longitudinal damping controller 414 and the speed controller, that an adjustment rate for the blade angle is output.

In any case, the longitudinal oscillations in FIG. 3 are symbolically illustrated by the two positions of the wind power installation 400. The longitudinal oscillation of the wind power installation 400 is thus illustrated by the oscillation arrow 416 in the exaggerated illustration.

Speed control is also indicated in this structure in FIG. 4, namely in the same manner as in FIG. 3. The explanation for simplification that a blade angle is output instead of an adjustment rate also applies to FIG. 4 accordingly.

In any case, a difference between the target speed $n_S$ and the actual speed $n_1$ is also formed at the first summing point 402 during this speed control. The control error e is passed to the controller 404 which outputs a blade angle $\alpha$ as the manipulated variable; an adjustment rate would be output in a variation.

The blade angle $\alpha$ is basically fed to the actuator 406. The actuator 406 then adjusts the rotor blades accordingly.

In addition, however, a blade angle $\delta_d$ can be applied to the second summing point 418. In the case of control using adjustment rates, adjustment rates would be added up there, namely from the speed controller on the one hand and from the longitudinal damping controller 414 on the other hand. The longitudinal damping control can be applied by the activation block 420.

It is proposed that, in the event of an expected overspeed, the addition of such a damping blade angle $\alpha_d$ is prevented. This is represented by an open switch in the activation block 420. The activation block 420 can of course be in the form of a computing unit which can be programmed in such a way that it outputs or does not output a damping blade angle $\alpha_d$. It also comes into consideration that the damping blade angle $\alpha_d$ is reduced, in order to be passed to the second summing point 418, instead of being completely set to zero. It also comes into consideration that in the activation block 420 a distinction is made as to whether the damping blade angle $\alpha_d$ is to be applied positively or negatively. If it is to be applied positively, it can be forwarded and then actually applied, namely at the second summing point 418. If it is negative, the application can be suppressed.

This ensures that a large blade angle or a large blade angle adjustment rate specified by the speed controller by way of the controller 404 is not attenuated by the longitudinal damping control or is not attenuated too much if an overspeed has been predicted.

The invention is also based on the following considerations or proposes the following aspects.

The following criteria or aspects for detecting critical overspeed events were found.

One possibility is to use an extrapolation.

It was recognized that time series of speed values can indicate a critical situation at an early stage. This is because such speed increase rates were often very high before overspeeds, although the speed itself was also already critical, i.e., close to the overspeed. Rapid speed increases are problematic in the case of large speed deviations from the target value, i.e., close to overspeeds, but are not a problem in the case of small deviations, especially at underspeeds.

Therefore, it was recognized and therefore proposed that it might be helpful to include both the speed and its evolution/history/increase rate in an early detection. As a new criterion for critical overspeed situations, it was therefore proposed to extrapolate the actual speed, in particular in filtered form, with its current increase rate for a future period. As a prediction horizon, it is proposed to use typical periods for wind events and a dynamic response of a wind power installation (2-5 seconds).

The speed controller gains are now adjusted on the basis of this extrapolated speed. These adjustments can be made using continuous interrelationships, or using stages, which can be chosen especially for practical reasons. The adjustment also cannot only take place as a function of extrapolated speed. Instead, the distance between the extrapolated speed and the shutdown threshold can be used or taken into account as a criterion during power-optimized operation, or an overspeed limit can be used or taken into account as a criterion for sound-reduced modes, i.e., how far the speed is from a shutdown. A speed threshold can also be taken into account as an additional criterion.

Alternatively or additionally, an ideal blade angle can be taken into account.

In particular, implementing the consideration of the speed profile, especially the extrapolated speed profile, can bring about a significant improvement, but this can be further improved. The use of an ideal blade angle can detect excessively sluggish control within a very short time by means of a corresponding comparison with the captured blade angle. In addition to extrapolation, or as an alternative thereto, a second criterion for detecting rare critical overspeeds is therefore proposed. The speed control can now also be intensified on the basis of such a skew as the difference between the ideal blade angle and the captured blade angle. This can be done in stages or continuously. It would also be advantageous here to have pilot control, i.e., a specification of a blade angle to be set outside a speed control loop, since the blade angle to be set is known with the ideal blade angle.

The other possible criteria are also proposed.

Furthermore, it is proposed that the aerodynamic power, i.e., the generator power plus the acceleration power or only the acceleration power, is used as a criterion to predict the time at which the overspeed threshold will be exceeded via inertia, assuming constant conditions.

In practice, this is very similar to using the extrapolated speed. As soon as this reaches the shutdown threshold, a shutdown would be expected after exceeding the prediction duration, under constant conditions.

In response to critical events, i.e., an expected overspeed, the following measures are proposed.

A first measure is to change the controller gain.

As already described, the speed controller parameters are temporarily increased as long as the critical event is predicted by the extrapolation.

One measure is to throttle tower damping.

A further detailed analysis has revealed that wind ramps, i.e., a wind speed that increases over time, especially a wind speed that increases quickly and in a ramped manner, persist for so long that the tower not only oscillates backwards, but also forwards again afterwards. Active tower damping systems want to dampen this forwards oscillation by pitching in, i.e., adjusting the blades in a direction that leads to an increase in power. However, this is unfavorable for a potential overspeed situation, and so pitching in is prevented by the tower damping methods in critical overspeed situations on the basis of the above-mentioned method. This can be done continuously or in stages. However, additional pitching out, that is to say a blade adjustment by the tower damping system in the opposite direction, namely in the direction of a feathered position, is still permitted according to a proposal, since it is positive for both the tower and the speed.

If a critical situation has been detected, this reaction is maintained at least for a certain duration, even if the critical situation is no longer present. For this duration, it is proposed to choose a typical duration of a tower oscillation, namely a duration of 3 to 8 seconds, in particular.

As described above, a further additional or alternative measure would be pilot control to the ideal blade angle.

Direct setting or approach of the blade angles to the value of the ideal blade angle is therefore proposed as a measure.

1. Method for controlling a wind power installation (100) which has rotor blades (108) whose blade angle is adjustable and which can be operated at a variable speed using speed control, wherein the speed control is prepared to control the speed to a variable target speed value, comprising the steps of:

evaluating a test criterion for predicting an emerging overspeed, predicting an overspeed ($n_U$) on the basis of the at least one test criterion, and changing the speed control if an overspeed ($n_U$) has been predicted.

2. Method according to 1, characterized in that the speed control is changed in such a way that a controller gain of the speed control (304) is increased if an overspeed ($n_U$) has been predicted.

3. Method according to 1 or 2, characterized in that an overspeed ($n_U$) denotes a speed which reaches or exceeds a speed limit value which is above a target speed, in particular a nominal speed, by a minimum exceedance value, wherein in particular the minimum exceedance value is at least 5%, preferably at least 10%, in particular at least 15%, of the target speed, and/or the changing of the speed control is carried out or started before the speed reaches the speed limit value, in particular before the speed reaches a value of 97% of the speed limit value, and/or the changing of the speed control is only carried out or started if the speed is above 90%, in particular above 100%, of the target speed or nominal speed.

4. Method according to any one of 1-3, characterized in that in order to predict an emerging overspeed ($n_U$), a speed profile is recorded as a time profile of the speed up to a current time and extrapolated in particular beyond the current time to a test time ($t_2$), and an emerging overspeed is predicted if the speed profile up to the test time ($t_2$) shows a speed increase that is above a predefinable increase limit value, and/or the speed profile has a gradient increasing over time, and/or the extrapolated speed profile up to the test time ($t_2$) reaches overspeed ($n_U$), and/or the extrapolated speed profile, before reaching the test time ($t_2$), in particular at a predefinable pre-test time ($t_1$), exceeds a limit speed ($n_L$) which is less than the overspeed ($n_U$).

5. Method according to any one of 1-4, characterized in that quantitative changing of the speed control, in particular an or the increasing of a controller gain, is carried out on the basis of a or the extrapolated speed profile, in particular in such a way that the quantitative changing is carried out on the basis of a magnitude of a or the speed increase, and/or the quantitative changing is carried out on the basis of a distance between the speed or the extrapolated speed profile and the limit speed ($n_L$) or a speed threshold value which is less than the limit speed ($n_L$) and greater than a or the target speed or nominal speed, in particular, the quantitative changing of the speed control is carried out in such a way that the controller gain is increased more, the greater a speed increase of the extrapolated speed profile, and/or the closer the extrapolated speed profile comes to the limit speed ($n_L$).

6. Method according to any one of 1-5, characterized in that speed control using a blade angle adjustment is provided, in which the blade angle is changed on the basis of the speed, and an overspeed ($n_U$) is predicted if the blade angle deviates from a variable reference blade angle ($\alpha_R$) by a predefinable differential blade angle, wherein in particular an ideal blade angle is specified as the reference blade angle ($\alpha_R$), and the ideal blade angle describes a blade angle that leads to a constant speed at a current operating point under steady-state conditions, wherein in particular the current operating point is indicated by a current speed value, a current generator power and a current wind speed.

7. Method according to any one of 1-6, characterized in that quantitative changing of the speed control, in particular an or the increasing of a or the controller gain, is carried out on the basis of a magnitude of a or the blade angle deviation, by which the blade angle deviates from a or the variable reference blade angle ($\alpha_R$), in particular in such a way that the controller gain is increased if the blade angle deviation exceeds a predetermined minimum deviation value, and/or the controller gain is increased more, the greater the blade angle deviation.

8. Method according to any one of 1-7, characterized in that damping control is provided and involves a change in the blade angle depending on a detected longitudinal oscillation of the wind power installation in order to dampen the longitudinal oscillation, and the damping control is changed if an overspeed ($n_U$) has been predicted, in particular—a gain of the damping control is reduced, the damping control is deactivated, and/or an adjustment of the blade angles of the rotor blades (108) by the damping control is allowed only in the direction of a feathered position.

9. Method according to any one of 1-8, characterized in that the changing of the speed control is only completely cancelled by a predeterminable extension time after the time at which an overspeed is no longer predicted, wherein the predeterminable extension time is particularly in the range of 1 to 10 seconds, in particular in the range of 2 to 5 seconds.

10. Wind power installation (100) which has rotor blades (108) whose blade angle is adjustable and which can be operated at a variable speed using speed control, wherein the speed control is prepared to control the speed to a variable target speed value, and the wind power installation (100) is prepared to carry out steps including:

evaluating a test criterion for predicting an emerging overspeed, predicting an overspeed ($n_U$) on the basis of the at least one test criterion, and changing the speed control if an overspeed ($n_U$) has been predicted.

11. Wind power installation (100) according to 10, characterized in that an installation control unit (103) is provided in order to control the wind power installation (100), and—the wind power installation (100), in particular the installation control unit (103), is prepared to carry out a method according to any one of 1 to 9.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method comprising:

controlling a wind power installation having a plurality of rotor blades, wherein:

the plurality of rotor blades have adjustable blade angles, the wind power installation is configured to be operated at a variable speed using speed control, the controlling of the wind power installation comprises:

controlling the speed control to a variable target speed value, the controlling of the speed control comprises:

evaluating a test criterion for predicting an overspeed, predicting the overspeed based on the test criterion, and changing the speed control if the overspeed has been predicted, the changing of the speed control includes increasing a controller gain of the speed control if the overspeed has been predicted, and the speed control works in such a way that a speed deviation defining a difference between the variable target speed value and an actual speed value leads, via the speed control, to a planned blade angle of at least one of the adjustable blade angles or a planned adjustment rate of at least one of the adjustable blade angles.

2. The method according to claim 1, wherein:

the overspeed denotes a speed which reaches or exceeds a speed limit value which is above a target speed by a minimum exceedance value, the minimum exceedance value is at least 5%, and/or the changing of the speed control is carried out or started before the variable speed reaches the speed limit value, and/or the changing of the speed control is only carried out or started if the variable speed is above 90% of the target speed or nominal speed.

3. The method according to claim 2, wherein the changing of the speed control is carried out or started before the variable speed reaches a value of 97% of the speed limit value.

4. The method according to claim 1, wherein:

to predict the overspeed, a speed profile is recorded as a time profile of the variable speed up to a current time and extrapolated beyond the current time to a test time to obtain an extrapolated speed profile, and the overspeed is predicted if:

the speed profile up to the test time shows a speed increase that is above a predefinable increase limit value, and/or the speed profile has a gradient increasing over time, and/or the extrapolated speed profile up to the test time reaches overspeed, and/or the extrapolated speed profile, before reaching the test time exceeds a limit speed, which is less than the overspeed.

5. The method according to claim 4, wherein:

quantitative changing of the speed control is carried out based on the extrapolated speed profile, the quantitative changing of the speed control is carried out based on a magnitude of an increase of the variable speed, and/or the quantitative changing is carried out based on a distance between the variable speed or the extrapolated speed profile and the limit speed or a speed threshold value which is less than the limit speed and greater than a target speed or nominal speed.

6. The method according to claim 5, wherein the quantitative changing of the speed control comprises increasing the controller gain.

7. The method according to claim 5, wherein, when the quantitative changing of the speed control is carried out:

the controller gain is further increased, wherein as a speed of the extrapolated speed profile increases the extrapolated speed profile comes closer to the limit speed.

8. The method according claim 1, wherein:

speed control using a blade angle adjustment is provided, in which a blade angle of the rotor blades is changed based on the variable speed, and the overspeed is predicted if the blade angle deviates from a variable reference blade angle by a predefinable differential blade angle, an ideal blade angle is specified as the variable reference blade angle, the ideal blade angle describes a blade angle that leads to a constant speed at a current operating point under steady-state conditions, and the current operating point is indicated by a current speed value, a current generator power, and a current wind speed.

9. The method according to claim 8, wherein:
quantitative changing of the speed control is carried out based on a magnitude of a blade angle deviation of the rotor blades,
the blade angle deviates from the variable reference blade angle,
the controller gain is increased if the blade angle deviation exceeds a predetermined minimum deviation value, and/or
as the controller gain increases, the blade angle deviation becomes greater.

10. The method according to claim 1, wherein:
damping control is provided and involves a change in a blade angle of the rotor blades depending on a detected longitudinal oscillation of the wind power installation to dampen the detected longitudinal oscillation, and
the damping control is changed if the overspeed has been predicted.

11. The method according to claim 10, wherein the damping control is changed if the overspeed has been predicted,
wherein:
a gain of the damping control is reduced,
the damping control is deactivated, and/or
an adjustment of the blade angle of the rotor blades by the damping control is allowed only in a direction of a feathered position.

12. The method according to claim 1, wherein:
the changing of the speed control is only completely cancelled by a predeterminable extension time after a time at which the overspeed is no longer predicted, the predeterminable extension time is in a range of 1 to 10 seconds.

13. The method according to claim 12, wherein the range is 2 to 5 seconds.

14. A wind power installation comprising:
a plurality of rotor blades with adjustable blade angles, wherein:
the wind power installation is configured to be operated at a variable speed using speed control,
the speed control is configured to control the variable speed to a variable target speed value,
the wind power installation is configured to:
evaluate a test criterion for predicting an emerging overspeed,
predict an overspeed based on the test criterion, and
change the speed control if the overspeed has been predicted,
a controller gain of the speed control is increased if the overspeed has been predicted, and
the speed control works in such a way that a speed deviation defining a difference between the variable target speed value and an actual speed value leads, via the speed control, to a planned blade angle of at least one of the adjustable blade angles or a planned adjustment rate of at least one of the adjustable blade angles.

15. The wind power installation according to claim 14, comprising:
an installation controller provided to control the wind power installation.

* * * * *